Oct. 27, 1942. W. G. CALKINS 2,299,877
METHOD OF MAKING POROUS METAL FRICTIONAL MATERIAL
Filed Nov. 10, 1939
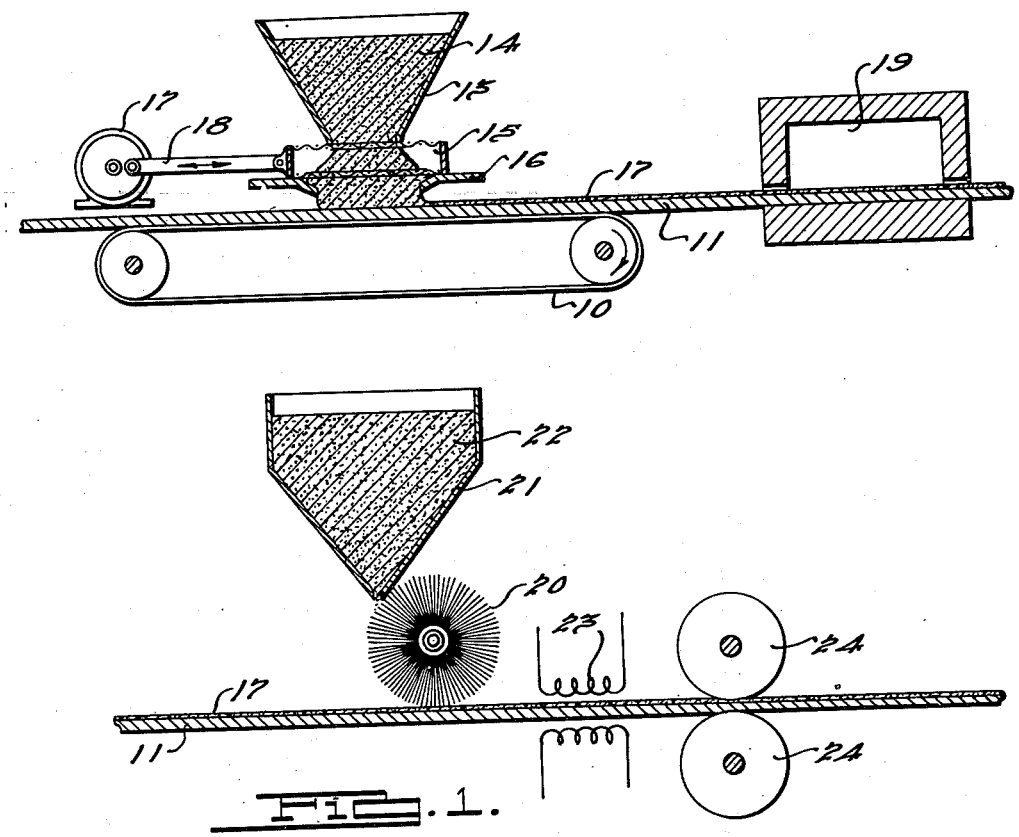
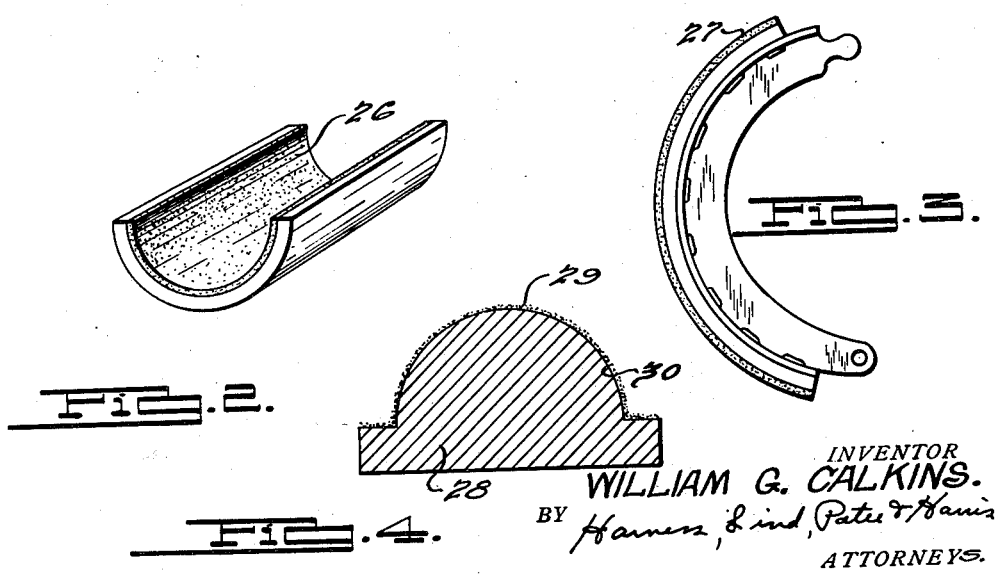
INVENTOR
WILLIAM G. CALKINS.
BY
ATTORNEYS.

Patented Oct. 27, 1942

2,299,877

UNITED STATES PATENT OFFICE 2,299,877

METHOD OF MAKING POROUS METAL FRICTIONAL MATERIAL

William G. Calkins, Detroit, Mich., assignor to Chrysler Corporation, Highland Park, Mich., a corporation of Delaware Application November 10, 1939, Serial No. 303,927

4 Claims. (Cl. 29—189)

This invention relates to improved porous metal products and particularly to the method of making the same.

More particularly, the invention pertains to a method of making improvements in porous metal products for use in filters, bearings, clutch and brake elements and the like.

One of the main objects of the invention is the provision of improved porous metal material which can be so controlled in porosity, composition and texture as to have a wide variety of applications and anti-frictional characteristics.

Another object of the invention is the provision of improved porous metal structures which have a materially greater porosity and less thickness than conventional metal structures of this class.

A further object of the invention is the provision of a relatively thin layer of porous metal material of this kind in which loosely arranged particles of powdered metals may be independently tenaciously bonded together or bonded together and to a reinforcing backing element.

A still further object of the invention is the provision of a loosely matted, tenaciously united mass of metal particles having uniformly distributed surface voids in which friction characteristic modifying agents, such as lubricating or friction producing material, may be conveniently entrapped by simple rolling or equivalent operations.

Other objects of the invention are to provide an improved method of making porous metal products by which is eliminated the requirement of compressing the powdered metal and other constituents of which such products are formed to a briquette under extremely high compression prior to sintering; to provide a method of this character which facilitates the impregnation of the surface pores of the product with large amounts of solid lubricant or solid friction promoting agents after sintering of the material so as to avoid alteration of such filling material by the temperature of the sintering operation and to facilitate bonding of the particles of powdered metal to each other and, in some instances, to a reinforcing backing in the absence of separating particles of non-metallic substances; and to provide a method of this kind by which the non-metallic unbonded ingredients of the porous metal product can be securely entrapped and held against displacement.

Illustrative embodiments of the invention are shown in the accompanying drawing in which:

Fig. 1 is a fragmentary, longitudinal, sectional view illustrating my improved method of making porous metal structures.

Fig. 2 is a perspective view of a bearing element having a layer of porous material embodying the invention.

Fig. 3 is a side elevational view representing a brake drum or other friction device having an operating surface comprising a porous metal structure embodying the invention.

Fig. 4 is a sectional view of a form having a filter thereon and illustrating the manner in which form the filter elements may be produced from porous metal material in accordance with the invention.

In Fig. 1 of the drawing is illustrated apparatus by which porous metal material embodying the invention may be manufactured in a continuous operation. This apparatus includes an endless conveyor 10 which is adapted to progressively move a support 11 in a predetermined course. Disposed above the conveyor 10 is a hopper 13 for receiving a charge 14 of powdered metal materials from which the porous metal structure is fabricated. The charge 14 may comprise a single powdered metal such as powdered copper, bronze, brass, iron, nickel, chromium and the like. Various modifying agents may be included in the charge and preferably thoroughly mixed with the powdered metal in order to provide a homogeneous mixture. If it is desired to employ the resulting porous structure as a bearing or in any desired contact with a relatively moving surface, solid lubricant such as powdered graphite or powdered exfoliated vermiculite may be included in the mixture. However, as hereinafter set forth, it is not necessary to introduce the solid lubricant into the charge of powdered materials at this stage of the process. If the resulting product is desired to have definite frictional rather than anti-frictional properties, friction producing agents, such as asbestos, silica and alumina, may likewise be introduced into the charge 14 but such agents may be omitted at this step of the process and introduced later as hereinafter set forth.

The charge from which the porous metal structure is produced may comprise for some applications a mixture of any of the foregoing powdered metals. Mixtures of copper and tin and copper and iron have been found particularly advantageous in the production of porous metal structures in accordance with the invention for certain purposes. When two or more different powdered metals are included in the charge, it is preferable to employ metals of markedly different melting temperatures in order that the particles of metal of higher melting point may be bonded together by integral bonds formed by fusion therewith of the particles of metal of lower melting point. When this condition exists, it is desirable to employ materially less of the metal of lower melting point than that of higher melting point, a ratio of from 10% to 20% by weight of the metal of lower melting point to from 80% to 90% by weight of the metal of higher melting point being satisfactory.

The charge of powdered material 14 is discharged from the hopper 13 upon a screen member 15 which is preferably slidably disposed on a support 16 and adapted to be drivingly reciprocated by a motor 17 through a link 18 eccentrically pivotally mounted with respect to the motor shaft and pivotally attached to the screen 15. The conveyor 10 is preferably driven at a suitable rate to progressively move the support 11 rightwardly as viewed in Fig. 1 while the screen 15 is reciprocated in order to lightly sift a comparatively thin film-like layer of the charge 14 upon the upper surface of the support 11. During this sifting operation, the particles of the charge are deposited in a layer of even thickness and in a loosely arranged manner.

When it is desired to produce a reinforced porous metal structure, the support 11 may comprise sheet metal material to which the powdered metal constituents readily bond when subjected to sufficiently high temperatures. If an unreinforced structure is desired, the support 11 may comprise a slab of graphite or other suitable refractory material. Stainless steel or ordinary sheet steel with a refractory coating on its upper surface may be employed as the support 11 in order to guard against bonding of the powdered metal constituents on the surface on which it is supported during the sintering operation.

The layer 17 of powdered metal constituents may be predetermined in thickness by proportioning the rate of discharge of the powdered metal material from the hopper 13 and the rate of progressive movement of the support 11 by the conveyor 10. As the support 11 and layer 17 thereon proceeds from the right end of the conveyor 10, they are introduced into and passed through a furnace 19 in which there is preferably provided an inert or non-oxidizing gaseous atmosphere. During movement of the layer 17 and support 11 through the furnace 19, the particles of powdered metal are preferably integrally bonded together by subjecting them to suitably high temperatures. Since the powdered metal constituents are disposed in a loose arrangement upon the support 11 and inasmuch as the layer is not compressed at any time prior to the sintering operation, compacting of the particles of powdered metal to a dense state is guarded against and only the contacting portions of the grains of powdered metal become integrally bonded together thus providing a substantially greater porosity in the resulting product than that present in conventional porous metal structures formed from briquettes which have been subjected to enormous pressures prior to sintering.

In manufacturing reinforced porous metal structures, the layer of powdered metal 17 is deposited on the reinforcing backing material in the manner described above and the assembly is then passed through the sintering furnace 19 in order to bond the particles of powdered metal together and simultaneously integrally bond the latter to the reinforcing backing. The temperature employed within the sintering furnace 19 depends, of course, upon the composition of the powdered metal layer 17. When the powdered metal layer 17 comprises iron, a sintering temperature of from 2000° F. to 2300° F. may be employed. When powdered copper and powdered iron constitute the main portion of the powdered metal charge, sintering may be conducted at 2100° F. and when copper, bronze or brass constitutes the main portion of the powdered metal charge, the sintering may be conducted at 1400° F. to 1650° F.

After the above-mentioned sintering operation, the resulting reinforced or unreinforced porous metal structure may be cut to desired lengths and formed to desired shapes and contours suitable for any applications. If the porous structure is to be used as bearing material, it may be treated in a continuing step of the process before the strip is cut into pieces of desired length by passing the porous metal either in a reinforced state or in an unreinforced state upon a suitable support beneath a brush 20 which is fed with a modifying agent from a hopper 21 disposed adjacent the brush. The modifying agent designated by the numeral 22 which is fed from the hopper 21 may comprise solid materials, such as graphite, powdered exfoliated vermiculite or similar solid lubricating materials or it may comprise friction producing agents such as finely divided asbestos, silica, alumina and the like. The brush 20 serves to distribute the modifying agent applied over the surface of the porous metal structure and to work particles of the agent into the pores of the structure. For some applications, it is desirable to apply modifying agents to the foregoing material in the form of mixtures or suspensions with a suitable vehicle. Various liquids such as water, alcohol, acetone, suitable hydrocarbon solvents and the like may be used for this purpose.

These vehicles serve to penetrate the pores of the porous metal structure and to carry substantial quantities of the solid modifying agent thereinto. Solid lubricant such as graphite may be combined with oil insoluble binders such as cellulose acetate and applied to the porous metal material in the foregoing manner. If it is desired to remove the vehicle when volatile substances are used for this purpose or to set the binder in instances where solid lubricant and binder are employed, the porous metal structure may be heated by electric or steam heating coils 23 or other suitable heating means. Following this operation the porous metal structure is preferably subjected to compression by passing it between pressure rollers 24. During this operation, the entrances to the pores of the surface of the porous metal structure are somewhat constricted in order to prevent displacement of the particles of solid modifying agent therefrom.

The resulting reinforced or unreinforced metal structure may be cut to desired lengths and formed to suitable shapes such as those illustrated in Figs. 2 and 3 for the purpose of producing bearing and friction elements respectively.

The porous metal layers 26 and 27 of the structure shown in Figs. 2 and 3, respectively, comprise relatively loosely arranged particles of powdered metal having contacting surface portions integrally bonded together and between which substantial voids occur. Porosity of 35% to 60% may be obtained in porous metal structures made in accordance with the invention.

The porous metal structures may be made in layers of film-like thickness and of sufficient porosity to enable the use of the structures as filter elements. If desired, the porosity of the material may be materially increased by introducing into the powdered metal charge substantial quantities of solid volatile material in a finely divided state such as stearic acid or boric acid which is volatilized and removed during the sintering step of the process. Filters of sheet-like contour may be produced by relatively sparingly and thinly depositing the metal charge in a comparatively thin film-like layer on the support 11 and passing the resulting layer through the sintering furnace 19. No further treatment of the sintered layer of loosely arranged particles of powdered metal is required for most filtering operations so that all that is necessary is to cut up the strip of porous metal so formed into pieces of the desired dimensions. For some filtering applications, the sheet-like pieces of porous metal may be drawn or otherwise deformed to non-planular contour. Cup-shaped filtering elements embodying the invention may be produced by depositing upon a form 28 illustrated in Fig. 4 a relatively thin film-like layer 29 of powdered metal and subsequently sintering the layer of the powdered metal charge in a suitable sintering furnace. The form 28 may comprise any desired refractory material and the powdered metal may be applied thereon by a sifting or sprinkling operation. In order to hold the powdered metal to the contoured surface of the form 28, the latter may be coated with a heavy oil or grease such as lanolin 30. After the sintering operation the sintered deposit of powdered metals may be stripped from the mold and the mold may be reused. The surfaces of the porous metal structures produced in the foregoing manner have a rather rough granular texture which may be conveniently brought to a smooth state suitable for bearing, braking and clutching applications by subjecting the porous metal to sufficient pressure between the rolls 24. When the rolling operation is employed subsequently to impregnation with a solid lubricant, such as graphite, for example, the resulting surface is found to have excellent bearing properties. Porous metal structures produced in the foregoing manner may also be impregnated with liquid lubricants which they readily absorb and retain in comparatively large quantities.

Although but several specific embodiments of the invention have herein been shown and described, it will be apparent that various changes in the materials employed and in the sequence of steps, as well as in the temperatures and periods of heating, may be made without departing from the spirit of the invention.

I claim:

1. The method of making a porous metal containing structure which comprises sprinkling by a sifting operation a layer of loosely arranged particles of powdered metals of different melting points on a sheet metal reinforcing backing, simultaneously bonding the particles of powdered metal of higher melting point together and to said backing by heating said backing and layer to a temperature between the melting points of said powdered metal particles while the latter are in a loosely arranged state with substantial voids therebetween, introducing a friction producing material into said voids, and thereafter applying pressure to the surface of said layer to entrap said material in said voids by at least partial closure of the latter.

2. The method of making a frictional material from a layer of porous metal comprising relatively loosely arranged particles of powdered metal having contacting surface portions integrally bonded together with substantial voids therebetween, which comprises introducing a non-metallic friction producing material into said voids, and so operating on said layer as to retain said friction producing material in said voids in the same state as that in which it was introduced therein.

3. The method of making a frictional material from a layer of porous metal comprising relatively loosely arranged particles of powdered metal having contacting surface portions integrally bonded together with substantial voids therebetween, which comprises introducing relatively finely divided asbestos into said pores, and retaining the same therein in the same state as that in which it was introduced by at least partially closing said voids to entrap said asbestos therein.

4. The method of making a porous metal containing structure which comprises depositing on a sheet metal reinforcing backing a layer of loosely arranged powdered metal particles with substantial voids therebetween, heating said layer to bond the particles thereof together and to said backing, introducing a non-metallic friction-producing material having a greater coefficient of friction than that of said metallic layer into said voids, and thereafter applying pressure to said layer to at least partially close said voids.

WILLIAM G. CALKINS.